Oct. 22, 1957 R. M. NORDBY 2,810,827

MIXED WAFER SWITCH AND TURRET TUNER FOR V. H. F.
WITH EXTRA TURRET FOR U. H. F.

Filed June 28, 1956 2 Sheets-Sheet 1

ROGER M. NORDBY.
*INVENTOR.*

BY John J. Pederson

HIS ATTORNEY.

MIXED WAFER SWITCH AND TURRET TUNER FOR V. H. F.
WITH EXTRA TURRET FOR U. H. F.

Filed June 28, 1956 2 Sheets-Sheet 2

ROGER M. NORDBY
*INVENTOR.*
BY John J. Pederson
HIS ATTORNEY.

2,810,827

MIXED WAFER SWITCH AND TURRET TUNER FOR V. H. F. WITH EXTRA TURRET FOR U. H. F.

Roger M. Nordby, Evanston, Ill., assignor to Zenith Radio Corporation, a corporation of Illinois Application June 28, 1956, Serial No. 594,550

5 Claims. (Cl. 250—20)

This invention relates to wave-signal tuners and in particular to tuners capable of receiving television signals in separated frequency ranges, such as the presently assigned V. H. F. (very-high frequency) and U. H. F. (ultra-high frequency) bands.

This invention provides a tuner for use in a television receiver to provide reception on all present V. H. F. channels in addition to reception on a number of preselected U. H. F. stations or future V. H. F. channels. Furthermore, the invention achives these functions with a unitary tuning instrumentality necessitating but a single indexed station selector for V. H. F. and U. H. F. reception.

A "tuner," as that term is used herein, embraces any device capable of distinguishing between wave-signals of different frequencies obtained from a radio-frequency source (which can be an antenna), amplifying, and heterodyning such R. F. signal with a locally generated oscillating signal to produce an output signal of a predetermined intermediate frequency.

V. H. F. television receiver tuners commonly in use today are of either the turret type or the band-switch type. The turret tuner is more costly but justifies such cost by its superior stability characteristics in that each channel is provided with its own local oscillator frequency determining unit on a detachable strip and thus is not subject to the additive error associated with band-switch arrangements; that is, if a particular channel on a turret tuner is detuned it does not affect the quality of reception on the other channels. However, the band-switch devices perform suitably where economy and simplicity of manufacture are the principal considerations.

The V. H. F. band comprises a spectrum extending from approximately 54 megacycles to 216 megacycles and embracing television channels 2 through 13. The U. H. F. band on the other hand is contained within the spectrum between 470 megacycles to 890 megacycles and is apportioned as to provide 70 television channels.

Present-day methods of incorporating U. H. F. station reception into a television receiver tuner primarily designed for V. H. F. reception have resulted in complex and costly tuning arrangements. An early method of providing U. H. F. reception in television receivers required a separate external U. H. F. converter. In addition to substantial initial cost, this arrangement presents the obvious disadvantage of requiring special connections (antenna switching, etc.) to facilitate adaptation to the V. H. F. television receiver.

A second method of providing U. H. F. and V. H. F. reception entails the use of continuous U. H. F. tuners. For U. H. F. reception, these devices require that the V. H. F. channel selector be appropriately switched to a predetermined position for U. H. F. reception, and thereafter the U. H. F. stations are selected by operation of a separate (continuous) tuning device. An obvious disadvantage of this type tuner, in addition to the multiple tuning procedure, is the sacrifice of channel indexing and the fact that the entire tuner is required even though only one U. H. F. station is available in the vicinity.

A third method of solving this problem takes into account the practical aspects regarding the number of U. H. F. stations which would be economically feasible in a given area. This approach involves utilization of a turret-type television tuner in which special U. H. F. signal translating circuits are mounted upon strips interchangeable with existing V. H. F. turret strips, as described and claimed in U. S. Patent No. 2, 596,117, issued to John F. Bell and Albert Cotsworth III, and assigned to the present assignee.

Obviously use of the preceding method of providing for U. H. F. reception in existing V. H. F. television receivers utilizing turret-type tuners requires removal of a V. H. F. turret strip to accommodate the U. H. F. turret strip. This would not seem to be a problem of considerable importance since it can be argued that the number of V. H. F. and U. H. F. stations in a given area would not require utilization of all the available strip positions on the turret tuner. This procedure, while technically sound and economically attractive, tends to confine reception to the pre-established U. H. F.—V. H. F. allocation of stations in the particular area, since the sacrifice of unused V. H. F. turret positions to accommodate U. H. F. stations would only accidentally be compatible with different geographical areas. A similar disadvantage would accrue should a new V. H. F. station commence operations upon a channel whose turret position had been previously delegated to a U. H. F. station. True, the turret strips can be interchanged, but storing and keeping track of the currently unused strips can be a nuisance. However, a turret-type tuner embodying the principles of the subject invention which can provide efficient U. H. F.—V. H. F. reception through one instrumentality and not require the sacrifice of any V. H. F. channel positions affords the material advantage of universal V. H. F. channel reception in addition to U. H. F. reception for selected stations by the use of easily insertable station strips.

It is therefore an object of this invention to provide a new and improved unitary tuning arrangement for wave-signal reception in a plurality of spaced frequency ranges, such as the presently assigned V. H. F. and U. H. F. television bands.

It is also an object of this invention to provide a television tuner for achieving universal V. H. F. reception as well as indexed U. H. F. reception on preselected U. H. F. television channels.

It is still another object of this invention to achieve these objectives while providing a common actuating member for both U. H. F. and V. H. F. station selection.

It is also an object of this invention to provide a television tuner having the economic advantages of a band-switch tuner in conjunction with the desirable properties and flexibility inherent in turret-type tuner devices.

In accordance with the invention, a wave-signal tuner having a plurality of receiving positions in a pair of frequency ranges comprises a signal-translating circuit for selecting signals in the first frequency range. A drum, fixed to a rotatable shaft, peripherally supports a plurality of local oscillator frequency-determining units tuned to different frequencies bearing a common frequency relation, such as a common frequency difference, to one of the signals in the first frequency range. Each of the frequency-determining units is provided with contact elements adapted to engage fixed contact means in the tuner upon rotation of the drum to a position for receiving a signal in the first frequency range. At least one additional frequency-determining unit is supported on a peripheral portion of the drum corresponding to a receiving position for signals in the second frequency range;

this additional unit is also provided with contact elements adapted to engage the fixed contact means upon rotation of the drum to a second frequency range receiving position. A local oscillator including an electron-discharge device is coupled to the fixed contact means for generating a signal of a frequency determined by the frequency-determining unit selected by the fixed contact means. Heterodyning means are coupled to the signal-translating circuit and to the local oscillator to develop an output signal of a predetermined intermediate frequency during reception of signals within the first frequency range. The tuner further comprises an additional drum likewise fixed to the rotatable shaft and in paraxial alignment with the first drum. A signal-translating unit tuned to a frequency in the second frequency range is peripherally supported on the additional drum, and the signal-translating unit is provided with contact elements adapted to engage switch contact means in the tuner upon rotation of the additional drum to the aforementioned receiving position for signals in the second frequency range. Means are provided for applying wave-signals in the second frequency range to the switch contact means, and means are also provided for supplying the local oscillator signal to the switch contact means upon rotation of the drums to the second frequency range receiving position. The signal-translating unit is provided with detector means responsive to concurrently received wave-signals in the second frequency range and the local oscillator signal for developing an output signal of the same predetermined intermediate frequency during reception of wave-signals in the second frequency range.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
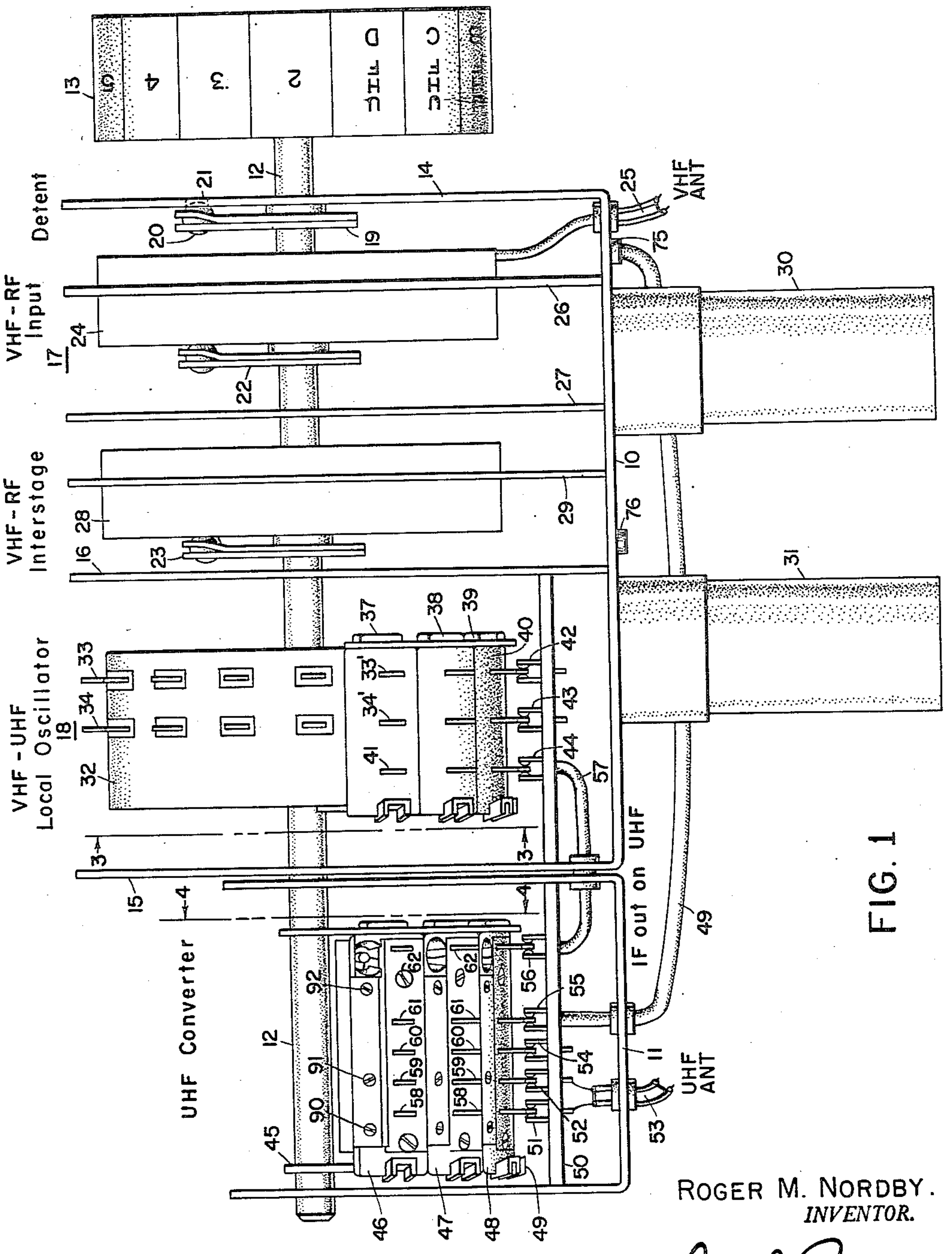
Figure 1 is a side view, partly schematic, of a television tuner embodying the invention.

The wave-signal tuner illustrated in Figure 1 comprises a pair of subchassis 10 and 11 which support a rotatable axial shaft 12 equipped with a fixed selector knob 13 suitably marked to indicate, in addition to the standard VHF channels, one or more UHF station selecting positions which can be designated alphabetically. Subchassis 10 is provided with metallic end walls 14 and 15 and is subdivided by a metallic wall 16 which separates subchassis 10 into a signal-translating section 17 and a local oscillator section 18.

A rotatable arm 19 fixed to axial shaft 12 is provided with a captive ball 20 which cooperates with perforations 21 located in end wall 14 in such a manner as to perform a conventional indexing and detent function upon rotation of shaft 12.

The signal-translating section 17 comprises a V. H. F. input circuit 24 which can be a conventional bandswitch type antenna input matching circuit including a wafer switch having a selector contact 22 for selective reception of V. H. F. signals from a source such as a lead-in transmission line 25 from an antenna (not shown), is supported on a rigid insulating element 26 fixed to subchassis 10.

A rigid metal member 27 fixed to subchassis 10 constitutes an electrostatic shield between input circuit 24 and an interstage coupling circuit 28 similarly supported upon a fixed rigid insulating element 29; coupling circuit 28 may also be of conventional bandswitch construction including a wafer switch having a selector arm 23. V. H. F. television signals are selected by input circuit 24, amplified by conventional means such as an R. F. amplifier 30, and applied to interstage circuit 31 in precisely the same manner as in the corresponding stages of a conventional bandswitch type television tuner.

Metallic wall member 16 further provides electrostatic shielding between interstage coupling circuit 28 and a local-oscillator drum 32 fixed to shaft 12. Oscillator drum 32 includes two parallel rows of contacts 33 and 34 upon its outer periphery, distributed circumferentially in mutual juxtaposition upon approximately three-fourths of the periphery of drum 32 adapted to engage fixed contacts 42 and 43 during reception of V. H. F. signals. The remaining quarter of drum 32 supports four local oscillator frequency determining units 37, 38, 39 and 40 associated with U. H. F. operation. Each of the aforementioned frequency determining units includes three outwardly projecting contacts 33′, 34′ and 41 adapted to engage the fixed contacts 42, 43 and 44 respectively upon rotation of shaft 12 to that position where knob 13 indicates U. H. F. signal reception.

Upon rotation of shaft 12 to a V. H. F. channel, drum contacts 33 and 34 can mate with fixed contacts 42 and 43 enabling the local oscillator portion of converter device 31 to generate a heterodyning signal bearing an intermediate frequency relationship to a particular V. H. F. channel.

Further rotation of shaft 12 can accommodate U. H. F. channel reception whereby contacts 33′, 34′ cooperate with fixed contacts 42, 43 respectively to provide in conjunction with converter device 31 a heterodyning frequency, a portion of which is made available at fixed contact 44 through frequency determining unit contact 41 for subsequent utilization.

Subchassis 11 in addition to providing end support for rotatable shaft 12 embodies a second drum device 45 in paraxial alignment with drum 32. Drum 45 supports U. H. F. signal translating units 46, 47, 48 and 49, each of which U. H. F. signal translating units can engage a switch contact assembly 50 fixed to subchassis 11 which assembly comprises a pair of input terminals 51, 52, that afford termination for a U. H. F. antenna lead-in 53, a grounding terminal 54, an output terminal 55 and a switch contact 56 coupled to a fixed contact 44 via the cable 57.

Figure 2:
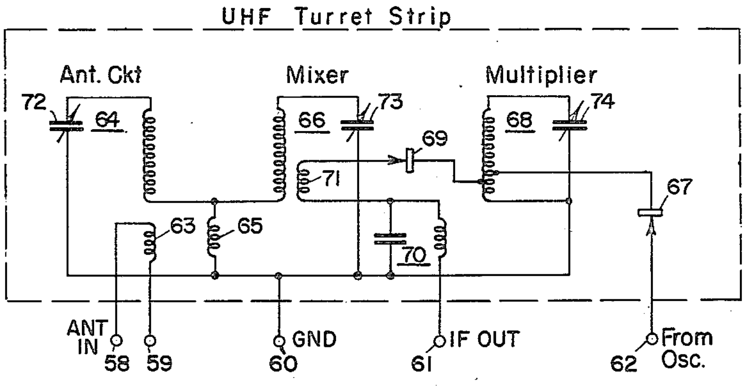
Figure 2 is a schematic diagram of a sub-unit utilized in this invention.

Figure 2 shows schematically the circuit configuration which obtains for U. H. F. signal translating units 46—49. Each of these U. H. F. signal translating strips comprise in addition to antenna input contact elements 58, 59, ground contact 60, output contact 61 and oscillator input contact 62, an input coupling coil 63, a tuned antenna matching circuit 64, a mutual coupling impedance 65 and a mixer circuit 66. Local oscillator energy appearing at input terminal 62 operates in conjunction with a harmonic generating crystal 67 and a multiplier circuit 68 to produce a specific harmonic frequency across mixer crystal 69. Output circuit 70 coupled to mixer circuit 66 through coupling coil 71 is tuned to a predetermined intermediate frequency.

The variable impedances 72, 73 and 74 tune antenna circuit 64, mixer circuit 66 and multiplier circuit 68, respectively. The output signal appearing at contact 61 can be returned through switch contact 55 to transmission line 49 and thence to receptacle 75 to provide amplification through the radio frequency amplifier 30 and converter 31. The output signal from converter 31 is available at an output jack 76 for subsequent utilization in a television receiver.

Figure 3:
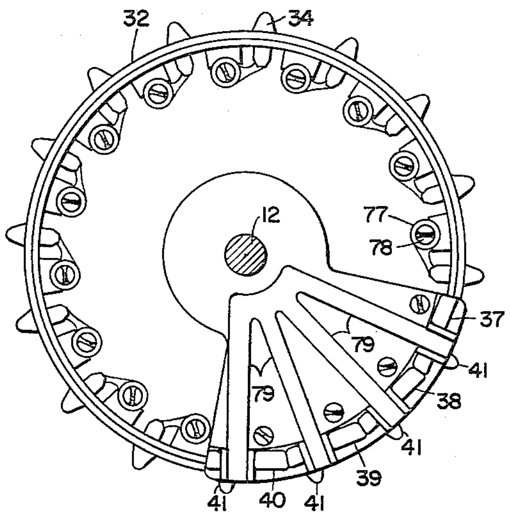
Figure 3 is a cross-sectional view taken along lines 3—3 of Figure 1.

Figure 3 illustrates an end view of oscillator drum 32 in which the frequency determining coils 77, and their related tuning slugs 78 are illustrated. The demountable frequency determining units 37, 38, 39 and 40 associated with U. H. F. signal reception are held in place by resilient fingers 79.

Figure 4:
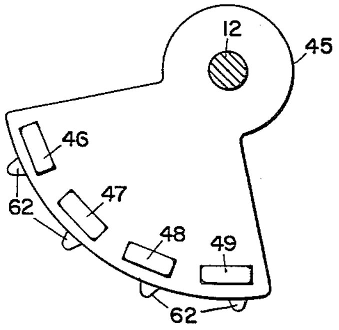
Figure 4 is a cross-sectional view taken along line 4—4 of Figure 1.

Figure 4 is an end view of drum 45 and illustrates the mounting arrangement utilized in supporting the U. H. F. signal translating units.

To operate within the V. H. F. band, selector knob 13 can determine the station to be received. Assuming in the first instance that a particular V. H. F. station is desired, selector knob 13, suitably guided by detent mechanism 19, 20 and 21, is rotated to the desired channel position whereby a specific configuration of input circuit 24 is determined by rotatable contact arm 22 to match the input signal from lead-in 25 to R. F. amplifier 30. In axial alignment with arm 22, contact arm 23 presents frequency selective circuitry relevant to the desired channel so as to produce a match between the output of R. F. amplifier 30 and the input of converter 31. Simultaneously and in paraxial alignment with the detent mechanism and contact arms 22 and 23, oscillator drum 32 presents a pair of contacts 33, 34 for cooperation with fixed contacts 42, 43 thus coupling coil 77 to that portion of converter 31 that determines an appropriate local oscillator signal which when mixed with the V. H. F. signal, selected by input circuit 24 and interstage circuit 28, in the appropriate section of converter 31, produces at terminal 76 an output signal of frequency comprising the difference between the selected V. H. F. signal frequency and the local oscillator signal frequency. The signal conventionally designated as the I. F. signal embodies the video, synchronizing and audio information and is available at output jack 76 for subsequent utilization in the television receiver.

Advertng to U. H. F. reception it can be seen that rotation of selector knob 13 can place terminals 58, 59, 60, 61 and 62 of U. H. F. frequency determining unit 49 in intimate contact with switch contacts 51, 52, 54, 55 and 56, respectively, as shown in Figure 1. Unit 49 is a demountable adapter unit constructed in accordance with the teaching of Patent 2,596,117, issued to J. F. Bell et al., and can convert a received U. H. F. wave-signal for operation in a V. H. F. television receiver. This conversion process is briefly explained below in conjunction with Figure 2.

A lead-in 53 provides a U. H. F. wave-signal at terminals 58, 59 of U. H. F. signal translating unit 49 through switch contacts 51, 52, which signal is made available to antenna circuit 64 through coupling coil 63. Mutual impedance 65 couples the energy to the mixer circuit 66. At this junction it is to be remembered that oscillator drum 32 being in paraxial alignment with drum 45 has required contacts 33′, 34′ and 41 of frequency determining unit 40 to engage fixed contacts 42, 43 and 44. This action connects the frequency determining coil 77 of unit 40 into the local oscillator portion of converter 31 so that a signal of a predetermined frequency is injected into the harmonic generating crystal 67 through the cooperative action of unit contact 62, switch contact 56, cable 57, fixed contact 44 and frequency determining unit contact 41 which is coupled to coil 77. Multiplier circuit 68 is tuned to that particular harmonic frequency generated by crystal 67 which frequency when applied to crystal 69 produces an intermediate frequency which is the difference between the U. H. F. input signal and the harmonic selected by multiplier circuit 68. This intermediate frequency is coupled to tuned circuit 70 through coupling coil 71 and thereafter made available for amplification in R. F. amplifier 30 through a signal path which can be the combination of input jack 75, and cable 49 which is connected to switch contact 55.

It should be noted that a particular advantage accrues through the use of this invention in regard to the generation of local oscillator signals required for heterodyning functions, i. e., the same oscillator can be used for U. H. F. as well as V. H. F. signal reception. Since any of the myriad of harmonics generated by crystal 67 can be selected by circuit 68 for the U. H. F. heterodyning function, the frequency of the local oscillator portion of converter 31 can be kept within that range of frequencies apropos to heterodyning of V. H. F. signals.

Thus it is seen that the problems and disadvantages associated with current methods of obtaining combined U. H. F.—V. H. F. reception in a television receiver are obviated through use of this invention. As has been described, a single control 13 selects any of the 12 V. H. F. channels or any of four U. H. F. channels, without requiring cumbersome cross-connections or extraneous tuning procedures and it may be noted that although the illustrated embodiment indicates provision for four U. H. F. stations, a greater or lesser number can be incorporated in a tuner of the type described herein without departing from the scope and spirit of the invention. Accordingly, this invention provides U. H. F.—V. H. F. television reception with a tuner operated by a single control mechanism to provide all-band television reception at minimum cost.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A wave-signal tuner having a plurality of receiving positions in a first frequency range and a plurality of receiving positions in a second frequency range for selectively receiving wave-signals on any of a plurality of signal channels including at least one in each of said first and second frequency ranges comprising: a signal-translating circuit for receiving wave-signals in said first frequency range; a rotatable shaft; a drum mounted on said shaft; fixed contact means; a plurality of frequency-determining units individually tuned to a different heterodyning frequency bearing a common frequency relation to one of said signals in said first frequency range and supported on a peripheral portion of said drum corresponding to one of said first frequency range receiving positions, each of said frequency-determining units comprising contact elements adapted to engage said fixed contact means upon rotation of said drum to a first frequency range receiving position; at least one additional frequency-determining unit supported on a peripheral portion of said drum corresponding to one of said second frequency range receiving positions, said additional frequency-determining unit comprising contact elements adapted to engage said fixed contact means upon rotation of said drum to a second frequency range receiving position; a local oscillator including an electric discharge device coupled to said fixed contact means for generating a local oscillator signal of a frequency determined by the frequency-determining unit selected by said fixed contact means; heterodyning means coupled to said signal-translating circuit and to said local oscillator to develop an output signal of a predetermined intermediate frequency during reception of wave-signals in said first frequency range; switch contact means; an additional drum mounted on said shaft in paraxial alignment with said first mentioned drum; a signal-translating unit tuned to one of said frequencies in said second range and supported on the periphery of said additional drum, said signal-translating unit comprising contact elements adapted to engage said switch contact means upon rotation of said additional drum to said second frequency range receiving position; means for applying received wave-signals in said second frequency range to said switch contact means; means for supplying said local oscillator signal to said switch contact means upon rotation of said drums to said second frequency range receiving positions; and detector means included in said signal-translating unit and responsive to concurrently received wave signals in said second frequency range and said local oscillator signal for developing an output signal of said predetermined intermediate frequency during reception of wave-signals in said second frequency range.

2. A television tuner having a plurality of V. H. F.-channel-receiving positions and a plurality of U. H. F.-channel-receiving positions for selectively receiving television signals on any of a plurality of signal channels including some in each of the V. H. F. and U. H. F. frequency ranges comprising: a signal-translating circuit for receiving television signals in said V. H. F. frequency range; a rotatable shaft; a drum mounted on said shaft; fixed contact means; a plurality of V. H. F. frequency-determining units individually tuned to a different heterodyning frequency bearing a common frequency relation to one of said V. H. F. channels and supported on a peripheral portion of said drum corresponding to one of said V. H. F.-channel-receiving positions, each of said V. H. F. frequency-determining units comprising contact elements adapted to engage said fixed contact means upon rotation of said drum to a V. H. F.-channel-receiving position; a plurality of U. H. F. frequency-determining units individually tuned to a different frequency bearing a common frequency relation to one of said U. H. F. channels and supported on a peripheral portion of said drum corresponding to one of said U. H. F.-channel-receiving positions, each of said U. H. F. frequency-determining units comprising contact elements adapted to engage said fixed contact means upon rotation of said drum to a U. H. F.-channel-receiving position; a local oscillator including an electric-discharge device coupled to said fixed contact means for generating a local oscillator signal of a frequency determined by the frequency-determining unit selected by said fixed contact means; heterodyning means coupled to said signal-translating circuit and to said local oscillator for utilizing said local oscillator signal to develop an output signal of a predetermined intermediate frequency during reception of television signals in said V. H. F. frequency range; switch contact means; an additional drum mounted on said shaft in paraxial alignment with said first-mentioned drum; a plurality of U. H. F. signal-translating units individually tuned to a different one of said U. H. F. signal channels and supported on the periphery of said additional drum in paraxial alignment with the one of said U. H. F. frequency-determining units assigned to a corresponding U. H. F. signal channel and individually comprising contact elements adapted to engage said switch contact means upon rotation of said additional drum to a U. H. F.-channel-receiving position; means for applying received television signals in said U. H. F. frequency ranges to said switch contact means; means for supplying said local oscillator signal to said switch contact means upon rotation of said drums to one of said U. H. F.-channel-receiving positions; and detector means included in each of said U. H. F. signal-translating units and responsive to concurrently received U. H. F. television signals and said local oscillator signal for developing an output signal of said predetermined intermediate frequency during reception of television signals in said U. H. F. frequency range.

3. A television tuner having a plurality of V. H. F.-channel-receiving positions and at least one U. H. F.-channel-receiving position for selectively receiving television signals on any of a plurality of signal channels including both V. H. F. and U. H. F. signal channels comprising: a signal-translating circuit for receiving television signals in said V. H. F. frequency range; a rotatable shaft; a drum mounted on said shaft; fixed contact means; a plurality of V. H. F. frequency-determining units individually tuned to a different heterodyning frequency bearing a common frequency relation to one of said V. H. F. channels and supported on a peripheral portion of said drum corresponding to one of said V. H. F.-channel-receiving positions, each of said V. H. F. frequency-determining units comprising contact elements adapted to engage said fixed contact means upon rotation of said drum to a V. H. F.-channel-receiving position; a U. H. F. frequency-determining unit supported on a peripheral portion of said drum corresponding to said U. H. F.-channel-receiving position, said U. H. F. frequency-determining unit comprising contact elements adapted to engage said fixed contact means upon rotation of said drum to said U. H. F.-channel-receiving position; a local oscillator including an electric-discharge device coupled to said fixed contact means for generating a local oscillator signal of a frequency determined by the frequency-determining unit selected by said fixed contact means; heterodyning means coupled to said signal-translating circuit and to said local oscillator for utilizing said local oscillator signal to develop an output signal of a predetermined intermediate frequency during reception of television signals in said V. H. F. frequency range; switch contact means; an additional drum mounted on said shaft in paraxial alignment with said first-mentioned drum; a U. H. F. signal-translating unit tuned to said U. H. F. signal channel and supported on the periphery of said additional drum in paraxial alignment with said U. H. F. frequency-determining unit, said U. H. F. signal-translating unit comprising contact elements adapted to engage said switch contact means upon rotation of said additional drum to said U. H. F.-channel-receiving position; means for applying received television signals in said U. H. F. frequency ranges to said switch contact means; means for supplying said local oscillator signal to said switch contact means upon rotation of said drums to said U. H. F.-channel-receiving positions; and detector means included in said U. H. F. signal-translating unit and responsive to concurrently received U. H. F. television signals and said local oscillator signal for developing an output signal of said predetermined intermediate frequency during reception of television signals in said U. H. F. frequency range.

4. A television tuner having a plurality of V. H. F.-channel-receiving positions and a plurality of U. H. F.-channel-receiving positions for selectively receiving television signals on any of a plurality of signal channels including some in each of the V. H. F. and U. H. F. frequency ranges comprising: a signal-translating circuit for receiving television signals in said V. H. F. frequency range; a rotatable shaft; a drum mounted on said shaft; fixed contact means; a plurality of V. H. F. frequency-determining units individually tuned to a different heterodyning frequency bearing a common frequency relation to one of said V. H. F. channels and supported on a peripheral portion of said drum corresponding to one of said V. H. F.-channel-receiving postions, each of said V. H. F. frequency-determining units comprising contact elements adapted to engage said fixed contact means upon rotation of said drum to a V. H. F.-channel-receiving position; a plurality of U. H. F. frequency-determining units individually tuned to a different frequency bearing a common frequency relation to one of said U. H. F. channels and supported on a peripheral portion of said drum corresponding to one of said U. H. F.-channel-receiving positions, each of said U. H. F. frequency-determining units comprising contact elements adapted to engage said fixed contact means upon rotation of said drum to a U. H. F.-channel-receiving position; a local oscillator including an electric-discharge device coupled to said fixed contact means for generating a local oscillator signal of a frequency determined by the frequency-determining unit selected by said fixed contact means; heterodyning means coupled to said signal-translating circuit and to said local oscillator for utilizing said local oscillator signal to develop an output signal of a predetermined intermediate frequency during reception of television signals in said V. H. F. frequency range; switch contact means; an additional drum mounted on said shaft in paraxial alignment with said first-mentioned drum; a plurality of U. H. F. signal-translating units individually tuned to a different one of said U. H. F. signal channels and supported on the periphery of said additional drum in paraxial alignment with the one of said U. H. F. frequency-determining units assigned to a corresponding U. H. F. signal channel and individually comprising contact elements adapted to engage said switch contact means upon rotation of said additional drum to a U. H. F.-channel-receiving position; means for applying received television signals in said U. H. F. frequency ranges to said switch contact means; means for supplying said local oscillator signal to said switch contact means upon rotation of said drums to one of said U. H. F.-channel-receiving positions; detector means included in each of said U. H. F. signal-translating units and responsive to concurrently received U. H. F. television signals and said local oscillator signal for developing an output signal of said predetermined intermediate frequency during reception of television signals in said U. H. F. frequency range; and means coupled to said switch contact means for applying said last-mentioned output signal to said signal-translating circuit to utilize said signal-translating circuit and said heterodyning means to provide intermediate frequency amplification during reception of U. H. F. television signals.

5. A television tuner having a plurality of V. H. F.-channel-receiving positions and a plurality of U. H. F. channel-receiving positions for selectively receiving television signals on any of a plurality of signal channels including some in each of the V. H. F. and U. H. F. frequency ranges comprising: a rotatable shaft; a signal-translating circuit for receiving television signals in said V. H. F. frequency range comprising a selectively tunable input circuit including a first wafer-type switching structure having a selector element fixed to said shaft, and a selectively tuned interstage circuit including a second wafer-type switching structure having a selector element fixed to said shaft; a drum mounted on said shaft; fixed contact means; a plurality of V. H. F. frequency-determining units individually tuned to a different heterodyning frequency bearing a common frequency relation to one of said V. H. F. channels and supported on a peripheral portion of said drum corresponding to one of said V. H. F.-channel-receiving positions, each of said V. H. F. frequency-determining units comprising contact elements adapted to engage said fixed contact means upon rotation of said drum to a V. H. F.-channel-receiving position; a plurality of U. H. F. frequency-determining units individually tuned to a different frequency bearing a common frequency relation to one of said U. H. F. channels and supported on a peripheral portion of said drum corresponding to one of said U. H. F.-channel-receiving positions, each of said U. H. F. frequency-determining units comprising contact elements adapted to engage said fixed contact means upon rotation of said drum to a U. H. F.-channel-receiving position; a local oscillator including an electric-discharge device coupled to said fixed contact means for generating a local oscillator signal of a frequency determined by the frequency-determining unit selected by said fixed contact means; heterodyning means coupled to said signal-translating circuit and to said local oscillator for utilizing said local oscillator signal to develop an output signal of a predetermined intermediate frequency during reception of television signals in said V. H. F. frequency range; switch contact means; an additional drum mounted on said shaft in paraxial alignment with said first-mentioned drum; a plurality of U. H. F. signal-translating units individually tuned to a different one of said U. H. F. signal channels and supported on the periphery of said additional drum in paraxial alignment with the one of said U. H. F. frequency-determining units assigned to a corresponding U. H. F. signal channel and individually comprising contact elements adapted to engage said switch contact means upon rotation of said additional drum to a U. H. F.-channel-receiving position; means for applying received television signals in said U. H. F. frequency ranges to said switch contact means; means for supplying said local oscillator signal to said switch contact means upon rotation of said drums to one of said U. H. F.-channel-receiving positions; and detector means included in each of said U. H. F. signal-translating units and responsive to concurrently received U. H. F. television signals and said local oscillator signal for developing an output signal of said predetermined intermediate frequency during reception of television signals in said U. H. F. frequency range.

References Cited in the file of this patent

UNITED STATES PATENTS

| | | |
|---|---|---|
| 2,596,117 | Bell et al. | May 13, 1952 |
| 2,646,513 | Marco | July 21, 1953 |